Feb. 8, 1927.
M. H. LOUGHRIDGE
1,616,455
AUTOMOBILE BUMPER
Filed Jan. 22, 1926   2 Sheets-Sheet 1
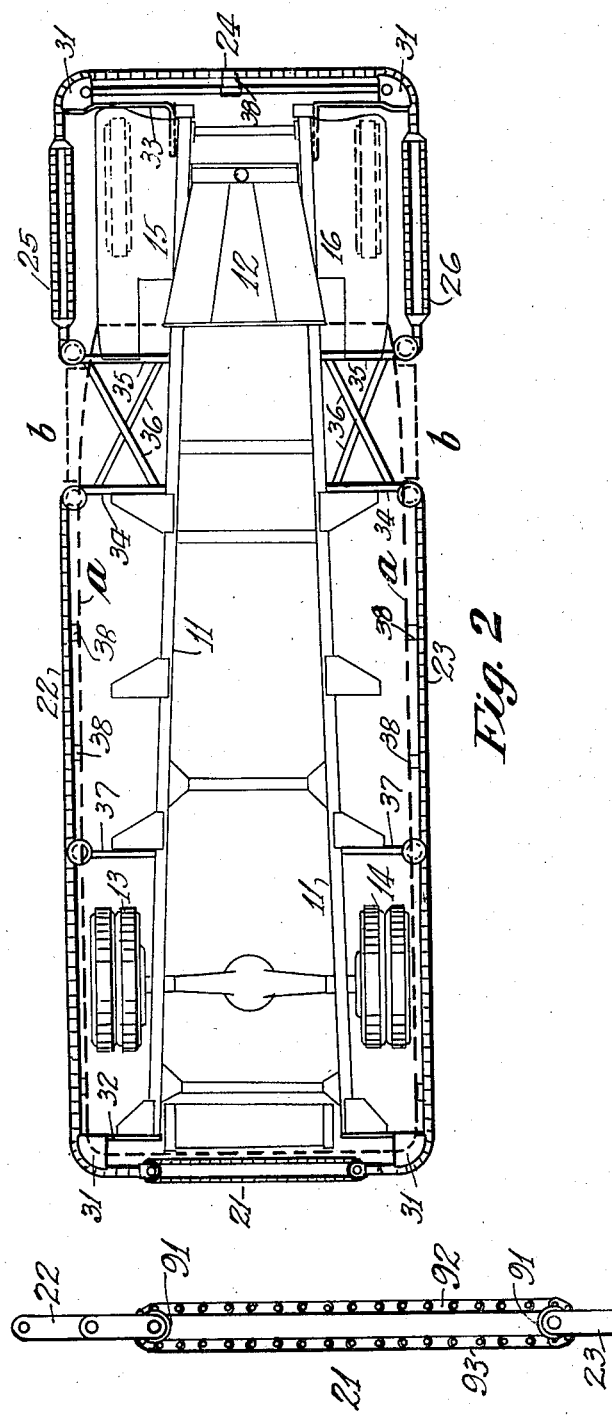
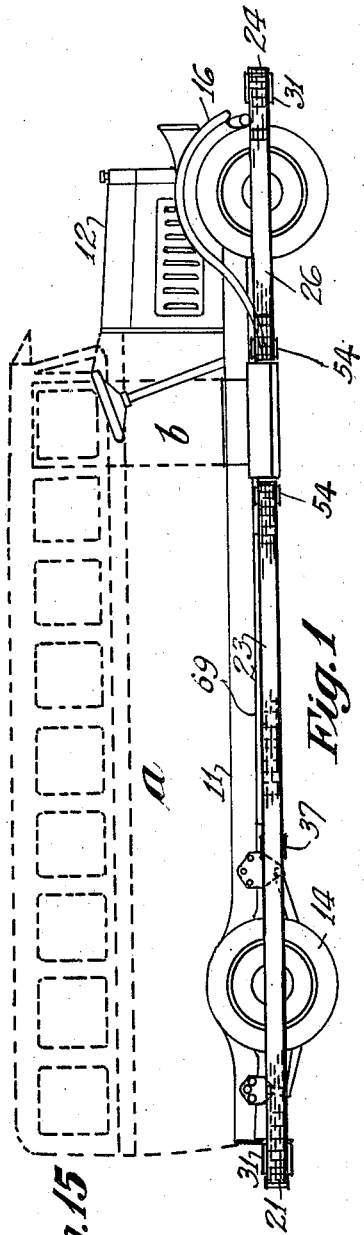
INVENTOR.
M. H. Loughridge Feb. 8, 1927. 1,616,455
M. H. LOUGHRIDGE
AUTOMOBILE BUMPER
Filed Jan. 22, 1926    2 Sheets-Sheet 2
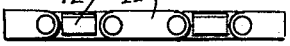
Fig. 3
Fig. 4
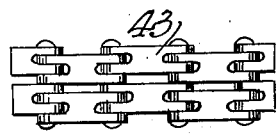
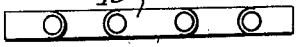
Fig. 5
Fig. 6
Fig. 7
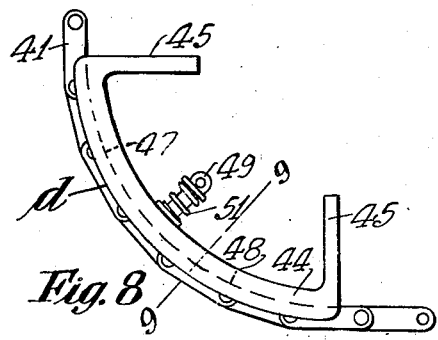
Fig. 8
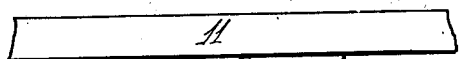
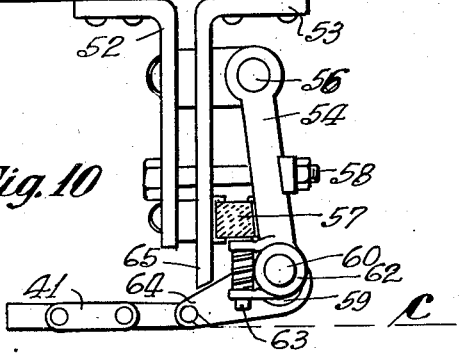
Fig. 10
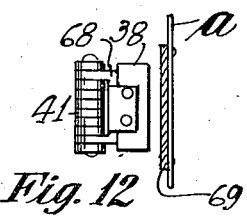
Fig. 9
Fig. 12
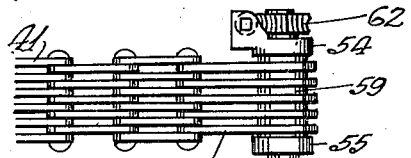
Fig. 11
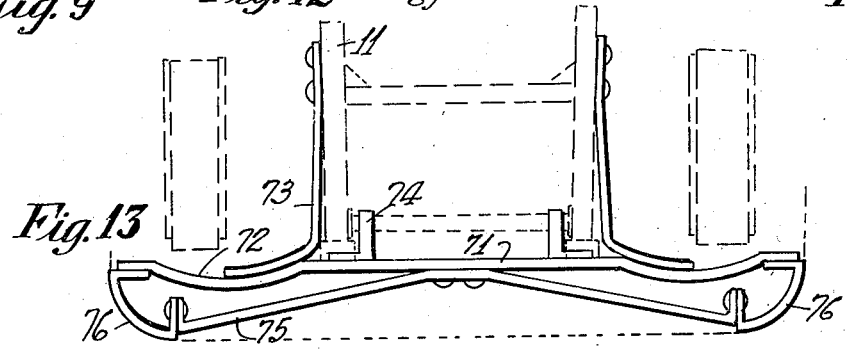
Fig. 13
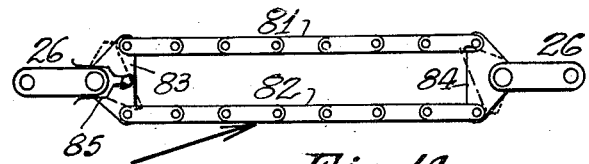
Fig. 14
INVENTOR.
M. H. Loughridge Patented Feb. 8, 1927.

1,616,455

UNITED STATES PATENT OFFICE.

MATTHEW H. LOUGHRIDGE, OF BOGOTA, NEW JERSEY, ASSIGNOR OF ONE-HALF TO HARRY W. DYER, OF NEW YORK, N. Y.

AUTOMOBILE BUMPER.

Application filed January 22, 1926. Serial No. 83,075.

This invention relates to vehicle bumpers and particularly to a flexible type of bumper that may be applied as a guard surrounding the entire vehicle. An object of the invention is to provide a bumper or guard made in the form of a flexible metallic belt of considerable width and strength placed around the vehicle at the most vital zone to receive and resist impacts; another object embodies a means for maintaining tension on a flexible impact member of a bumper; another object is to provide means for detaching the bumper or impact member at different points so that the parts of the vehicle may be accessible; another object is to provide a bumper comprising a flexible impact member so arranged that the impact member extends outside the plane of its supports; another object is to provide a uniform, flexible impact member around a vehicle and another object is to construct a bumper and fittings of such strength and rigidity as will protect and stop a vehicle in emergencies. Other objects of the invention will be understood from the following specification and the accompanying drawings, in which, Fig. 1 is a side elevation of a vehicle equipped with a bumper guard according to this invention, Fig. 2 is a plan view of an automobile chassis equipped with a bumper guard, Figs. 3 and 4 show one type of flexible impact member that may be used in applying this invention, Figs. 5 and 6 show an alternative type of flexible impact member, Fig. 7 is an end view of one of the units used in Fig. 5, Fig. 8 shows the construction of the corner of the vehicle with the supporting means of the guard, Fig. 9 is a section on line 9—9 of Fig. 8, Fig. 10 is one form of attaching bracket with tensioning means, Fig. 11 is an elevation of the bracket in Fig. 10, Fig. 12 is a detail of the impact member showing its relation to the side of the vehicle, Fig. 13 is a frame construction for attaching the bumper guard to the vehicle, Fig. 14 is a detail in the construction of the impact member, and Fig. 15 is another detail in the construction of the impact member.

Automobile bumpers as constructed at the present time comprise a spring bar clamped to the frame of the vehicle by suitable brackets. Generally, the brackets are flimsy and the bar is able to resist only a comparatively limited impact. Bumpers of this type are used mainly to protect the fenders and the enamel of the car and are of little value in a collision.

The present invention proposes to build a guard around the vehicle on the line of its extreme clearance so that this guard will be the first member to receive an impact from any direction. The impact member of the guard comprises a belt built in the form of a transmission chain which has a high degree of flexibility and great strength and can be constructed to resist impacts of any magnitude. This belt construction can be made of any desired width to protect the vehicle, while, vertically, it takes up comparatively little space. The width of the belt increases the area of the impact and lessens the extent of the damage. The flexible nature of the belt distributes the force of the impact. The chain type of construction used enables this belt to be easily taken apart and avoids stretching.

The belt guard is arranged to protect the sides as well as the ends of the vehicle and is so supported that this guard forms the extreme clearance line around the vehicle so that an impact received from any direction will always engage the impact member first. The end brackets of the guard member are pivotally mounted under spring action so that this member is continuously maintained under tension. Where the guard member is located close to the vehicle body, it is spaced therefrom by rubber pads which protect the enamel of the body and absorb the impact. In heavy cars where this bumper is to be used to its greatest utility it is intended that the supporting brackets will be substantially constructed and secured to the chassis of the vehicle.

Referring to the drawings, 11 is the frame of the vehicle, 12 is the engine, 13 and 14 are the rear wheels and 15 and 16 are the front fenders protecting the front wheels. The flexible impact member of the bumper guard is indicated by 21, 22 and 23 for the rear portion of the vehicle and by 24, 25 and 26 for the front portion of the vehicle. This belt guard is supported at the corners by the corner supports 31 secured at the rear by brackets 32 and at the front by brackets 33 to the frame of the vehicle. The guard member is omitted at *b* opposite the doors, the rear guard terminating on the brackets 34 and the front guard terminating on the brackets 35. These brackets may be cross-connected by the bars 36 as shown. Intermediate supports are provided for the side guards at 37 and the rubber pads 38 at spaced intervals may be placed between the guard and the body of the vehicle indicated in outline at *a*.

In the construction described it will be noted that the belt guard passes around the vehicle enclosing the wheels and the under part of the body and protects the body against side swipes and impacts. Where a number of side doors are used, the doors may be arranged to open above the belt and the ends of the belt may be brought close together, however it is preferable to use different belt guards for each end of the vehicle.

The flexible impact member may be constructed of plain links as indicated at 41, Figs. 3 and 4, such as used in a transmission chain. A chain of this character is noiseless, flexible and can be disconnected at any pivot. This chain is also smooth on its exposed face and without projecting edges so that it does not "hook" objects engaging therewith. In order to remove the ridges from the top and bottom edges of the chain the intermediate link 42 is turned over as shown to fill the gap between the two connecting links.

The alternative chain shown in Figs. 5 and 6 has adjacent links made from one piece with their edges turned parallel as shown at 43, Fig. 7, and as more fully described in my co-pending application, Serial No. 51,670, filed August 21, 1925.

The preferable support for the corner of the impact member is a channel upon which the impact member may slide. The legs of this channel are narrower than the depth of the impact member so that the face of the impact member is exposed and protects the channel support. This construction is shown in Figs. 8 and 9. The channel 44 is curved to the desired radius of the corner and may be secured in position by the inwardly turned ends 45 secured to suitable brackets or to a portion of the vehicle frame. The chain guard 41 passes around this channel with its edge projecting beyond the edge *d* of the channel and is free to slide over the channel as the tension on the ends is varied. In ordinary usage the channel holds the chain in position while it is under tension. It is desirable however to secure the chain to the channel by a sliding connection so that if the chain is disconnected at any point or its tension relieved, it will be held in position on the corner channels. For this purpose a pair of parallel slots 46 are provided in the channel between the points 47 and 48. Through the upper slot a link 49 extends at right angles to the chain and which may be pivoted to the chain between the regular pivots of the chain, or one of the chain links may have a right angle projection corresponding to 49. By means of the spring 51 and suitable washers this link holds the chain in the channel and slides therewith in the slot. A corresponding link 50 may be used to secure the chain in the lower slot.

As the impact member is flexible but non-resilient it is desirable to introduce a spring in the connections so that it will be constantly under tension. One arrangement for securing this condition is provided in the bracket, Fig. 10. This bracket comprises the members 52 and 53 secured to the frame 11 and forming a truss at right angles thereto. A pair of parallel arms 54 and 55 are pivotally connected to the bracket at 56 and at the outer end pivotally support an eccentric drum 59 by the pivot 60. Secured to the pivot 60 is the worm wheel 62 which is operated by the worm 63 accessible from the side of the vehicle. Links 64 are pivotally mounted on the drum 59 and form the connection for the end of the chain 41 as shown. The arms 54 and 55 engage the block of rubber 57 which is compressed between the bracket and these pivoted arms and thereby applies a spring bias to these arms. The lever arrangement, it will be noted, increases th action of the spring at the links 64. It is apparent that other forms of compression springs may be substituted for the rubber if preferred. It will be noted that the projecting end 65 of the bracket pushes the chain end of the links 64 outward so that the bracket itself falls inside of the line of the bumper *c* and there is no part of the brackets or attachments projecting beyond the plane of the impact member. These tension brackets are preferably applied at each termination of the guard member as indicated by 54 at the end of 23 and 26, Fig. 1.

In using this bracket for attaching or removing the guard, the bolt 58 is tightened to retain the tension in spring 57. The worm 63 is then operated until the links 64 are slackened by the eccentric. The same operation should be performed on the bracket at the opposite side of the vehicle. In this position the tension on the chain is released and it may be disconnected at any link pivot or it may be unhooked at the links 64 and turned around to make the side of the vehicle or the wheel accessible. When reassembled, the chain is hooked to the links 64, the worm is turned to bring the eccentric into the tension position and then bolt 58 is released to apply the spring action. The bolt 58 thus provides a means for removing the spring action of the bumper while it is being adjusted.

In Fig. 12 a method of securing the rubber pads is disclosed. The pads 38 are secured to the clamp 68 which is linked to the chain 41. This pad registers with a guard 69 which is detachably secured to the body of the vehicle *a* opposite the guard as indicated in Fig. 1. This guard may be canvas or wood and is introduced between the impact member and the vehicle to protect the metallic body of the vehicle.

One type of supporting structure for the corner supports is shown in Fig. 13. This comprises a frame which may be secured to the vehicle body and suitably braced to support the corner channels. This frame comprises a through bar 71 which is curved at 72 to clear the wheel and is attached to the vehicle frame by the bracket 73 which is preferably secured to the straight part of the frame and by the brace 74. The channel corners 76 are secured to the through bar 71 and the brace 75 thus forming a rigid support for the corners.

The style of the attachment to the vehicle naturally varies with the vehicle construction and the strength desired in the brackets. The brackets and attachments shown should be regarded as typical of one form of construction which may be varied to suit conditions.

It is apparent that the strength of the belt can be varied by varying the size of stock in the links. It is also apparent that belts can be arranged in parallel rows placed vertical to cover an extensive area of the vehicle body similar to the practice now adapted in spring bar bumpers. This bumper is thus readily adaptable for any size and shape of vehicle.

A novel feature embodied in the impact member of this invention is shown in Figs. 2 and 14 and can be applied with flexible or rigid impact members. This includes an impact member which is movable parallel with the vehicle body and when so moved reduces the clearance line of the bumper, at the same time the resistance of the bumper to direct impacts is maintained. This is secured by a pair of parallel impact members placed opposite each other and connected through floating levers with the vehicle. Normally these members are spaced apart by the floating levers but upon receiving a side swipe the outer member moves parallel with the vehicle in the direction of the blow and the members close together to reduce the clearance.

Referring to Fig. 14, the impact members 81 and 82 are maintained parallel by the floating levers 83 and 84 which connect to the impact member 26 and to the vehicle through the brackets. A spring 85 normally holds the impact members 81 and 82 apart. When an impact is received in the direction of the arrow the floating levers 70 are deflected as indicated in dotted outline. This brings the impact members 81 and 82 together without increasing the length of the impact member 26 and at the same time reduces the clearance of the impact member by bringing 82 substantially into alignment with 26. It is apparent that the thrust imparted to 82 is equally absorbed by 81 through the floating connections.

It is well known that the most satisfactory way for absorbing a shock with the least injury to the parts receiving the impact is for the part receiving the impact to move in the direction of the impact. In this construction the part 82 moves with the impact in either direction and at the same time reduces the clearance line.

In the construction in Fig. 15 the impact member is made in the form of an endless belt with the object of providing rolling friction between the impacting objects. In this construction the impact member 21 between the corner supports 31, Fig. 2, comprises the endless belt 92—93 which is free to move on the rollers 91 which are pivotally connected with the impact belt 22 and 23. The tension on the impact belt maintains the endless belt taut so that it forms a continuation of the impact belt and will resist a direct impact similarly to the impact belt. It is apparent that any deflecting impact engaging the endless belt will cause this belt to move on the rollers 91 thus providing rolling friction between the parts and deflecting off the impact. This endless belt construction may be provided in sections throughout the guard member.

Having thus described my invention, I claim:

1. In a vehicle bumper guard as described, the combination of a flexible impact member comprising a flat band with the flat side vertical with supporting means, said impact member projecting beyond said supporting means.

2. In a vehicle bumper guard as described, the combination of a flexible impact member comprising a flat band with the flat side vertical with supporting brackets secured to the frame of the vehicle, said impact member projecting beyond the vertical plane of said brackets.

3. In a vehicle bumper as described, the combination of a flexible impact member extending around a plurality of sides of said vehicle, and supporting brackets maintaining said member taut and straight with relation to the vehicle, said impact member forming the clearance line of the vehicle.

4. In a vehicle bumper guard as described, the combination of a flexible impact member extending around a plurality of sides of said vehicle, and means maintaining said member taut and straight and securing said member to the vehicle, said member presenting a continuous, uniform surface on the clearance line of said vehicle.

5. A vehicle bumper comprising an impact member made by articulated links connected by vertical pivots and formed into a belt and means securing said belt to the vehicle.

6. A vehicle bumper comprising a flat, flexible impact member extending around the corners of the vehicle and curved channels at said corners supported by the vehicle and supporting said impact member.

7. A vehicle bumper as described comprising a flexible impact member and a pivoted link for attaching said member to the vehicle, said link extending in the same direction as said impact member and located within the clearance line of said bumper.

8. A vehicle bumper as described comprising a flexible impact member extending around the corners of the vehicle, a curved support at said corners and means slidably securing said impact member to said support.

9. A vehicle bumper as described comprising a flexible impact member extending around the corners of the vehicle, a curved support at said corners having a slot therein and means engaging said impact member through said slot whereby said member is slidably secured to said support.

10. A vehicle bumper as described comprising a flexible impact member extending around the corners of the vehicle, a support at said corners slidably engaging said impact member and spring controlled means securing said member to said support.

11. A vehicle bumper as described comprising a flexible impact member extending parallel with and spaced from the body of the vehicle and rubber pads interposed between the impact member and the vehicle body.

12. A vehicle bumper as described comprising a flexible impact member extending parallel with and spaced from the body of the vehicle and removable shields interposed between the impact member and the vehicle body.

13. A vehicle bumper as described comprising a flat, flexible impact member extending around one end and both sides of the vehicle, slidable supports for the corners of said impact member and springs at each end applying tension to said member.

14. A vehicle bumper as described comprising a flexible impact member extending around one end and both sides of the vehicle and a tension spring controlled by an eccentric for applying tension to said member.

15. A vehicle bumper as described comprising a flexible impact member, brackets supporting said member parallel with the vehicle body, a spring for applying tension to said member and a worm gear for controlling said spring.

16. A vehicle bumper as described comprising a flexible impact member, a bracket with a pivoted arm secured to the vehicle frame, said member secured to said arm and a tension spring associated with said arm.

17. A vehicle bumper as described comprising a flexible impact member, a bracket having a rigid part secured to the vehicle frame, and an arm pivotally secured to said rigid part and connected therewith by means of a spring, said member secured to said arm.

18. A vehicle bumper as described comprising an impact member, an arm pivotally connected with the vehicle frame connected with said impact member, a spring applying tension to said arm and means for restraining the tension on said spring.

19. A vehicle bumper as described comprising a vehicle frame, an impact member, an arm pivotally connected with said vehicle frame, a tensioning mechanism associated with said arm and said mechanism operatively connected with said impact member.

20. A vehicle bumper as described comprising a pair of impact members arranged parallel with the vehicle body and having a longitudinal movement relative to the vehicle body.

21. A vehicle bumper as described comprising a pair of spaced impact members arranged parallel in a horizontal plane and having longitudinal movement relative to the vehicle body.

22. A vehicle bumper as described comprising a pair of spaced impact members connected by floating levers to move parallel to each other and arranged to reduce the clearance upon receiving an impact.

23. A vehicle bumper as described comprising an impact member secured to the vehicle frame and a projecting member linked with said impact member and having a longitudinal movement relative to said vehicle.

24. A vehicle bumper as described comprising a flexible impact member under tension secured to the vehicle and a projecting impact member linked with said flexible impact member and having longitudinal movement relative to said flexible impact member.

25. In a vehicle bumper, the combination, a flexible impact member secured to the vehicle, said member comprising a pair of floating levers with flexible impact members extending between the ends of said levers and means for applying tension to said impact member.

26. A vehicle bumper as described comprising a pair of spaced impact members, one behind the other and parallel with the vehicle body, said members pivotally connected through floating levers and said floating levers formed on an incline towards their point of support.

27. A vehicle bumper as described comprising an impact member with supporting brackets, said impact member comprising single and double sections between said brackets and said double sections being constructed of flexible material.

28. A vehicle bumper as described comprising a flexible impact member with single and double impact sections pivotally connected.

In testimony whereof, I hereunto affix my signature.

MATTHEW H. LOUGHRIDGE.